(12) United States Patent (10) Patent No.: US 11,785,131 B2
Negahban et al. (45) Date of Patent: Oct. 10, 2023

(54) ENHANCED TEXT-TO-911 SYSTEM VIA CLOUD-BASED PAGE SERVICE

(71) Applicant: BEAMLIVE INC, Woodside, CA (US)

(72) Inventors: Mehrdad Negahban, Woodside, CA (US); Michael Patrick Jones, Woodside, CA (US); Sahand Negahban Hagh, Woodside, CA (US); Brad Andrew Keahi Beck, Woodside, CA (US); Edward Chau Hoy, Woodside, CA (US)

(73) Assignee: BEAMLIVE INC, Woodside, CA (US)

( * ) Notice: Subject to any disclaimer, the term of this patent is extended or adjusted under 35 U.S.C. 154(b) by 0 days.

(21) Appl. No.: 17/199,776

(22) Filed: Mar. 12, 2021

(65) Prior Publication Data

US 2022/0116496 A1 Apr. 14, 2022

Related U.S. Application Data

(63) Continuation of application No. 17/073,213, filed on Oct. 16, 2020, now Pat. No. 10,972,599.

(60) Provisional application No. 63/198,380, filed on Oct. 14, 2020.

(51) Int. Cl.
*H04M 1/72418* (2021.01)
*H04W 4/12* (2009.01)
*H04W 4/38* (2018.01)
*H04W 4/70* (2018.01)
*H04W 4/90* (2018.01)

(52) U.S. Cl.
CPC ........ *H04M 1/72418* (2021.01); *H04W 4/12* (2013.01); *H04W 4/38* (2018.02); *H04W 4/70* (2018.02); *H04W 4/90* (2018.02); *H04M 2250/12* (2013.01)

(58) Field of Classification Search
CPC ..................... H04M 1/72418; H04M 2250/12
See application file for complete search history.

(56) References Cited

U.S. PATENT DOCUMENTS

| 8,792,867 | B1 | 7/2014 | Negahban |
| 8,913,981 | B1 | 12/2014 | Schumacher |
| 8,948,732 | B1 | 2/2015 | Negahban |
| 8,965,988 | B1 | 2/2015 | Negahban |
| 10,616,412 | B1 | 4/2020 | Brosowsky |
| 10,972,599 | B1 | 4/2021 | Negahban |
| 11,057,897 | B1 | 7/2021 | Negahban |
| 2004/0176123 | A1 | 9/2004 | Chin |
| 2009/0003659 | A1 | 1/2009 | Forstall |
| 2009/0154659 | A1 | 6/2009 | Morin |

(Continued)

*Primary Examiner* — Ernest G Tacsik
(74) *Attorney, Agent, or Firm* — ESPLIN & ASSOCIATES, PC

(57) ABSTRACT

Disclosed is a system and method of providing enhanced content to a PSAP or other service center whereby when a 911 call is to be initiated, prior to the call or text communication being sent, the software application on the device contacts the cloud-based dynamic page service. The cloud-based dynamic page service receives event information, dynamically creates a page for the event along with a page identifier, and sends the page identifier to the software application of the initiating device. Then, the software application on the device initiates a 911 communication and includes the page identifier with the communication. In some cases, the page identifier may be sent as a separate communication.

18 Claims, 4 Drawing Sheets

(56) References Cited

U.S. PATENT DOCUMENTS

| | | |
|---|---|---|
| 2012/0214437 A1 | 8/2012 | Ray |
| 2013/0052982 A1* | 2/2013 | Rohde ............... H04M 1/72424 |
| | | 455/404.1 |
| 2013/0166580 A1* | 6/2013 | Maharajh ............... G06Q 10/10 |
| | | 707/758 |
| 2014/0287714 A1* | 9/2014 | Marshall ............... H04W 76/50 |
| | | 455/404.1 |
| 2014/0300739 A1* | 10/2014 | Mimar ................... G06Q 40/08 |
| | | 348/148 |
| 2016/0345150 A1* | 11/2016 | Shim ..................... H04W 76/50 |
| 2017/0055136 A1* | 2/2017 | Lee ......................... H04W 4/12 |
| 2017/0078226 A1 | 3/2017 | Daly |
| 2017/0156045 A1 | 6/2017 | Balabhadruni |
| 2019/0313230 A1 | 10/2019 | Macgabann |
| 2019/0335298 A1 | 10/2019 | Mbonye |
| 2019/0394337 A1* | 12/2019 | Hassan ................. H04W 76/50 |
| 2020/0221279 A1 | 7/2020 | Mehta |

* cited by examiner

ENHANCED TEXT-TO-911 SYSTEM VIA CLOUD-BASED PAGE SERVICE

FIELD OF THE INVENTION

The invention relates to a system and method for enhancing text-to-911 communications via a cloud-based page service.

BACKGROUND OF THE INVENTION 911 requests are primarily handled by resources referred to as public safety answering points (PSAP). A PSAP is a call center where emergency calls (like police, fire brigade, ambulance) initiated by any mobile or landline subscriber are terminated. Currently, the means to make a qualified call to PSAP typically involve dialing 911 from a mobile or fixed phone or using text-to-911 from a mobile phone. A conventional PSAP is a call center responsible for servicing 911 voice calls made to an emergency telephone number, where a 911 operator answers the call, speaks to the caller to determine the nature of the emergency and assigns the request to a first responder (e.g., police, firefighters, ambulance service or other resource).

SUMMARY OF THE INVENTION

In the United States, usually a PSAP is assigned responsibility for servicing 911 calls made from a given calling area. A 911 call made in the US is directed to a PSAP assigned with a service area that services the caller's location. Triangulation is used between cell towers to define the location and how to route the call or request to a regional PSAP. Conventional PSAPs typically have the capability of receiving requests by voice calls only, and then subsequently servicing the request through voice only. For example, not all PSAPs have or will have the capability to receive text, media, sensor information, and all file types and/or handle all communication protocols that various requesting devices may be able to provide.

This creates a technical problem with respect to determining which file types and communication protocols should be used for a given request, assuming there is an assigned PSAP in that service area. Thus, there is a technical challenge in connection with knowing, for a given request and based on where a person or devices is at the time of the request, which PSAP will be assigned to handle the request and the capabilities of that PSAP (e.g., capabilities to receive text, media, location and different file types, communicate via different communication protocols and/or other capabilities).

The so-called next generation 911 (NG911) enables some other limited types of communication, such as text and media.

More recently, in a variety of contexts, sensors and/or other devices create and communicate data and/or alerts that may relate to an event that needs to be serviced by a resource, such as a PSAP. These sensors and other devices may create data/content that goes beyond just voice or text. They may include, live streaming of video and audio, multimedia, live GPS or location data, Internet of Things (IoT) data and other forms of vital and life related content. Most 911 PSAP call center systems are not equipped to handle multimedia content as part of a 911 call, and some have restrictions on doing so. This is a significant drawback and a technical limitation with existing 911 systems.

These and other drawbacks and technical limitations exist with current PSAP and 911 communication systems and technology. Similar problems exist more broadly in connection with communication by other sensors and connected devices and IoT data that generate an event-based request communication ("ERC") or an alert for service (e.g., for a PSAP) for an event that is communicated to other resources One or more implementations of the system and methods described herein address these and/or other technical drawbacks of current systems.

One aspect of the present disclosure is related to the recognition that it would be beneficial to communicate 911 requests and/or facilitate servicing the 911 requests using richer and/or live types of content other than just voice or text, despite the technical limitations and prohibitions of existing 911 PSAPs. For example, for 911 or other requests, it would be beneficial to be able to transmit one or more of text, pictures, video files, streaming live video, audio files, streaming live audio, live sensor information (e.g., Global Positioning System (GPS) information or other location information, biometric sensor information, crash sensor information, and/or other information) and/or other multimedia or other enhanced content (i.e. content beyond that of just voice or text).

One problem to date is that PSAPs have been leery about or prohibited from accepting data (other than call or text) from various sensors due to potential reliability and validity issues with the data. The inherent ability for fraudsters to transmit fake sensor data via a simple cell or text communication is a technical problem with existing communications networks. Some embodiments overcome this and other technical problems to safely communicate enhanced 911 content and/or sensor data to a PSAP in the following manners.

According to some embodiments, the following is an example of how enhanced content, including sensor information (e.g., smartphone and/or other sensors' information) can be securely transmitted to a PSAP, given the existing technology infrastructure and limitations of PSAPs.

One implementation of the invention relates to ERC software application in the form of a secure mobile app (SMAPP) on a smart phone, IoT sensor and/or other client device. First, the user accesses the ERC software application to initiate a qualified "call" to a PSAP using text-to-911 from the device. In general, when an ERC call is to be initiated from a device via cellular or other phone communication channel or by text-911, prior to the call or text communication being sent, the software application on the device contacts a cloud-based dynamic page service as described below. The cloud-based dynamic page service receives event information and/or other information, dynamically creates a page for the event along with a page identifier, and sends the page identifier to the ERC software application of the initiating device. Then, the software application on the device initiates the call or text communication to the 911 PSAP and includes the page identifier with the communication. In some cases, the page identifier may be sent as a separate communication. The PSAP operator can access the dynamic page via the page identifier and receive enhanced content that is dynamically update via the cloud-based page service. This may be done by accessing the Page identifier sent via text to the PSAP as part of, or subsequent to, the initiation of the call. The page may be viewed on any suitable computer display.

The dynamic page and cloud-based page service may be implemented as described in one or more of U.S. Pat. No. 8,965,988 ("System and method for providing an event-based and shared page connectivity platform"), U.S. Pat. No. 8,948,732 ("System and method for responding to service requests and facilitating communication between relevant parties") and U.S. Pat. No. 8,792,867 ("System and method for responding to service requests and facilitating communication between relevant parties"), each of which is incorporated herein in their entirety by reference.

In other alternatives, the system may add, to the text (or as a separate text subsequent to the initiation of the call), one or more of the page identifier (ID) for a dynamic page ("Page") of a cloud-based page service (described below), a page identifier for a page in a private, FedRamp-certified cloud or a designated private cloud, a Page URL, and/or other page identifier.

The enhanced text-to-911 according to one or more implementations of the present disclosure has at least 3 technical advantages. For example, it is considered a qualified means of communicating an emergency 911 request to a PSAP. The enhanced text can carry vital information, including information about Where, What and Who.

Where is the location: can be extracted live from GPS of a device?
What is the incident type: can be identified from sensor type, voice to text or video and image recognition?
Who is the caller: can be identified via phone number, or live audio/video and image recognition, age, gender, race, and medical 911 profile?

The dynamic Page content can include numerous enhanced features. It can include all 3 of the main required 911 features (Where, What and Who) info mentioned above. This data can be obtained, for example, from IoT sensor data including LIVE STREAM of GPS and Camera via the Dynamic Page, for example. All information can be transmitted to and processed via the cloud-based page service and output as useful content via a dynamic Page generated by the cloud-based dynamic page service and/or otherwise. The content may include an "executive summary" delivered via text-to-911 and can include live data via a Page. Other delivery options may be used.

Other features and advantages are set forth and will be apparent from the further description below.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
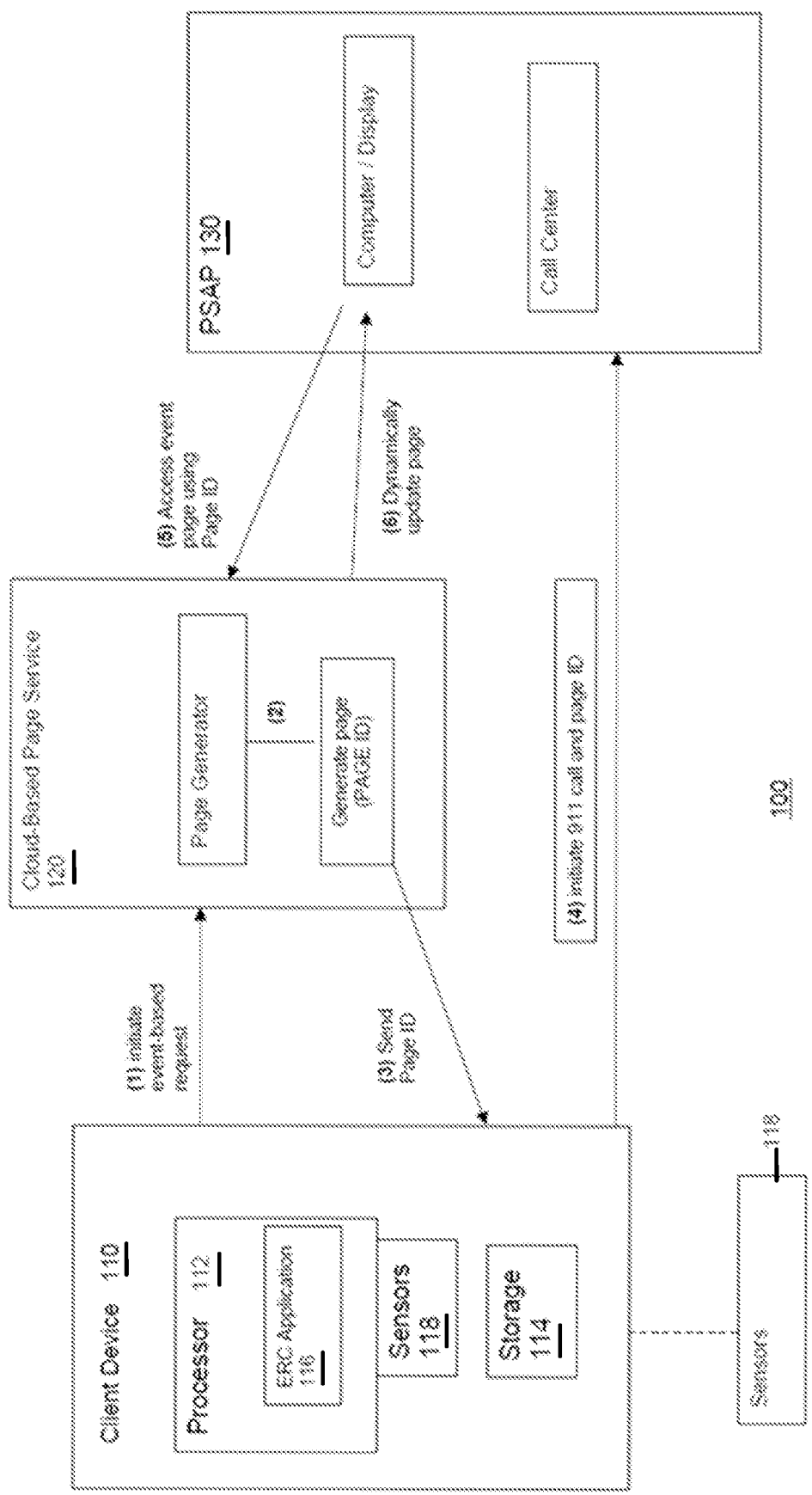
FIG. 1 illustrates a system for enhancing text-to-911 communications via a cloud-based page service.

One or more implementations of the systems and methods described herein relate to a system and method for enhancing text-to-911 communications to a PSAP and/or other service center for the event-based requests generated by smart phones and/or other devices. Various approaches can be used consistent with one or more aspect of the disclosure presented herein.

In various examples throughout this description, reference is made to initiating a 911 call. This can refer to initiation via a call from a smart phone and/or other client device using a cellular call or text to 911 call initiation feature. As described in some cases, an IoT device or other sensor-based device with communications ability may create an alert that leads to initiation of a 911 call. The reference to a call is for illustrative purposes. Text, data and other types of communications may be used.

As used herein, the term "Event-based Request Communication" (and its acronym, ERC) refers to a communication that conveys a request for a resource relating to an event. The event may be an emergency event for which a 911 operator at a PSAP is needed to route the request to a first responder and/or other resource. Other events can be handled with the technology of the invention.

The descriptions referring to a PSAP are for illustrative purposes. Other types of service requests may be generated and communicated as described herein. Other call service centers may be use in other examples. However, certain aspects of the invention specifically relate to known problems with PSAPs and limitations relating thereto.

One aspect of the invention relates to an ERC computer software application comprising computer program instructions that are programmed into a computer hardware processor of a client device (e.g., a smart phone). The ERC software application may be used to initiate the 911 call after first communication with the cloud-based page service and obtaining a page ID for the event. Additionally, the ERC software application may determine a type of communication and format the "call" request through a channel that is selected by the application. An ERC may be conveyed via (and may be formatted according to) one or more types of communication channels. A communication channel may include a format or medium through which a communication may be sent. For example, and without limitation, a communication channel may include a voice (e.g., audio) channel, an image (e.g., video or photographic) channel, a text-based (e.g., Short Message Service (SMS)) channel, a multi-media Message Service (MMS) channel, electronic mail, and/or other type of format or medium through which a communication may be sent. As such, an ERC may include a phone call, an SMS text message, an MMS message, an electronic mail message, and/or other communication through which information may be transmitted.

In some implementations, the system may include a client device, which may be operated by an end user making an event-based request. The client device may be programmed with the ERC software application to initiate an event-based request based on one or more triggers that indicate an event-based request should be made.

The one or more triggers may include, without limitation, user input via user interface elements, placement of a phone call (e.g., to "911"), user selecting to generate a text-911 call, detection of a condition or an alert (e.g., based on sensor data), and/or other information indicating that an event-based request should be generated. It should be noted that the event-based request may be triggered by other devices as well (such as a device operated by another user making an event-based request on behalf of another user). In some cases, a sensor may be in communication with a mobile phone (or other device), and the device may initiate the call based on the receipt of certain sensor data (e.g., an alert).

As described below, there are various different scenarios and ways by which the enhanced content may be sent to the PSAP (or other service center). In general, when an ERC call is to be initiated from a device via cellular or other phone communication channel or by text-911, prior to the call or text communication being sent, the software application on the device contacts the cloud-based dynamic page service. The cloud-based dynamic page service receives certain event information about location of the request, content about the type of event and the bio/identity of caller and/or other information, dynamically creates a page for the event along with a page identifier, and sends the page identifier to the ERC software application of the initiating device. Then, the ERC software application on the device initiates the call or text communication and includes the page identifier with the communication. In some cases, the page identifier may be sent as a separate communication.

Exemplary System Architecture

FIG. 1 illustrates a system of automatically generating an ERC, including a client device 110 with ERC software application for communicating with a cloud-based dynamic page service, which generates a dynamic page and page identifier and sends at least the page identifier to the client device so that the client device can initiate a 911 call and include the page identifier. In an implementation, system 100 may include one or more of client devices 110, a cloud-based dynamic page service 120, a PSAP 130, and/or other components.

Client Device 110

Client device 110 may include one or more of one or more processors 112 (also interchangeably referred to herein as processors 112, processor(s) 112, or processor 112 for convenience), one or more storage devices 114, and/or other components. Processors 112 may be programmed by one or more computer program instructions. For example, processors 112 may be programmed by an ERC software application 116, and/or other instructions. As used herein, for convenience, the various instructions will be described as performing an operation, when, in fact, the various instructions program the processors 112 (and therefore client device 110) to perform the operation. Client device 110 may include a standalone device (e.g., a smartphone), may include one or more sensors 118 and/or or may be in communication with one or more sensors 118.

Cloud-Base Page Service 120

The cloud-based page service 120 may be used to dynamically generate and update event-based pages. The dynamic page and cloud-based page service may be implemented as described in one or more of U.S. Pat. No. 8,965,988 ("System and method for providing an event-based and shared page connectivity platform"), U.S. Pat. No. 8,948,732 ("System and method for responding to service requests and facilitating communication between relevant parties") and U.S. Pat. No. 8,792,867 ("System and method for responding to service requests and facilitating communication between relevant parties"), all of which are incorporated herein in their entirety by reference. For simplicity, the details from the prior patents are not replicated in the drawings. For simplicity, the cloud-based page service 120 is shown as receiving event-based requests, generating an event page and page identifier (ID), sending the page ID to the client device and dynamically updating the page.

The cloud-based page service 120 may comprise a computer system with one or more processors, one or more storage devices and/or other components (not shown). The processors may be programmed by one or more computer program instructions, which may be stored on the storage device. The processors may be programmed to execute the functionality described herein and as described in the patents incorporated herein by reference.

PSAP 130

The PSAP 130 or other call service center can be a standard PSAP and/or call center. One advantage of the invention is that the PSAP does not have special hardware or modifications to leverage the advantages of the present disclosure. The PSAP 130 can receive the page ID and use a standard computer and display to access the event-based page and receive dynamically update page information.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

As shown for example in FIG. 1, a client device 110 may initiate an event-based request (1) which is communicated via the ERC application 116 to the cloud-based dynamic page service 120. The cloud-based dynamic page service 120 generates an event page and a page identifier (2). The cloud-based dynamic page service 120 sends the page identifier to the client device 110 (3). The client device 110 initiates a qualified 911 call to the PSAP 130 and includes the page ID (4). The 911 call is handled by the PSAP and the PSAP operator can use the page ID to access the event page (5) via a computer and computer display. The cloud-based dynamic page service 120 can dynamically update the event page (6). The event page may be shared with other entities related to the event.

Figure 2:
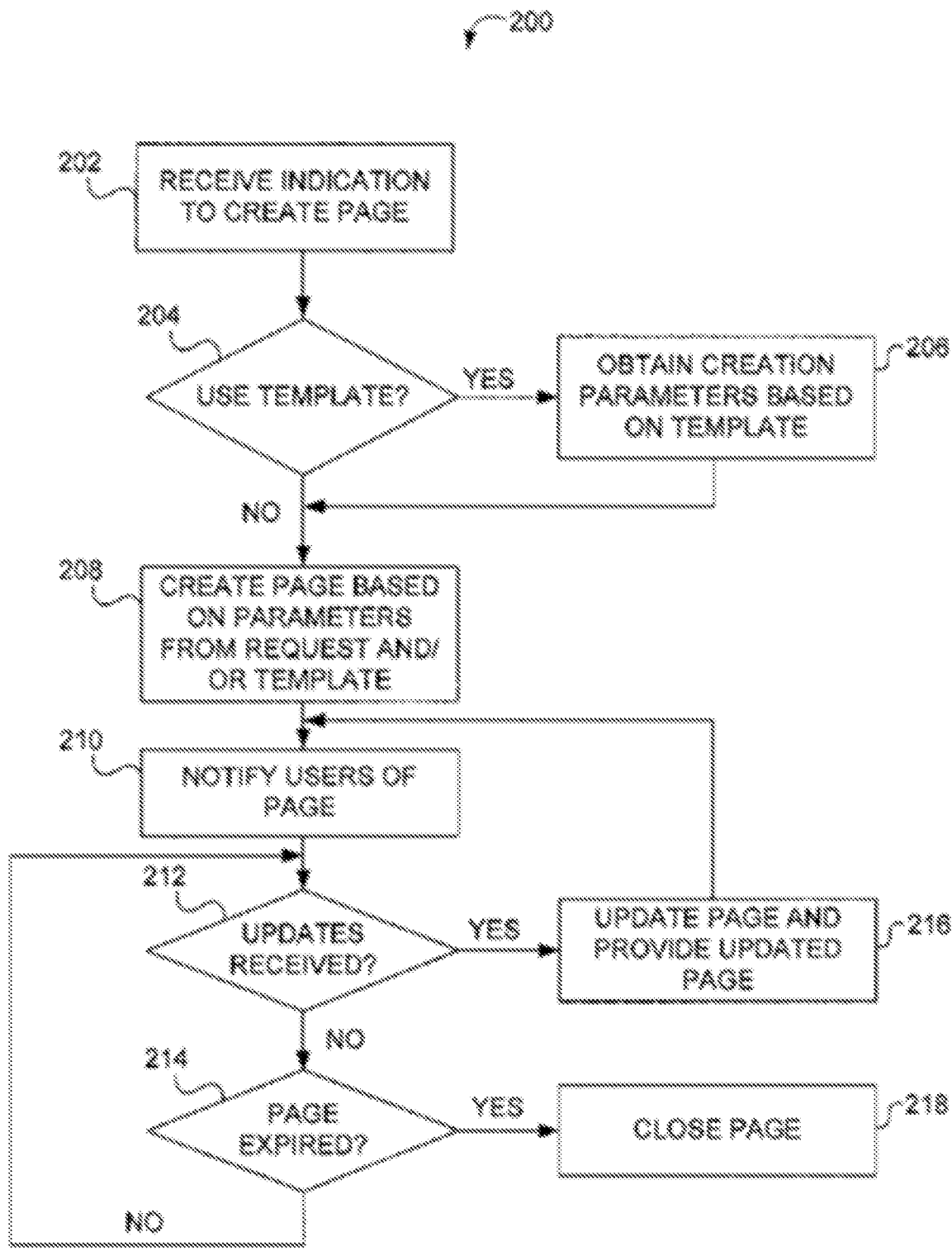
FIG. 2 illustrates a process for generating and updating a dynamic page by the cloud-based page service.

FIG. 2 depicts a process 200 for generating and/or updating a dynamic page by the cloud-based page service. In an operation 202, an indication to create a page may be received. The indication may originate from a user who is manually requesting to create a shared page (e.g., via input using a user interface for page creation) or from an automated process that is creating a shared page based on a trigger or other information.

In an operation 204, a determination of whether to use a template may be made. For example, the request may include a template identifier and/or the request may be associated with a template that should be used.

In an operation 206, if a template should be used, creation parameters used to create the shared page may be obtained based on the template.

In an operation 208, a page may be created based on creation parameters included in the request and/or creation parameters obtained from the template.

In an operation 210, users associated with a shared page may be notified of the shared page. For example, users with whom the page has been shared (which may include any users who created the page) may be notified that the page has been created and/or updated.

In an operation 212, a determination of whether any updates have been received is made. Updates may include updates manually entered by a user and/or updates automatically provided by various user devices without intervention by a user. The updates may include video, image, audio, text, location information, motion information, ambient condition information, and/or other types of information.

If an update is received, the shared page may be updated and provided to the various users with whom the page has been shared in an operation 216 and processing may return to operation 210, where the various users may be notified of the update. In no updates have been received, a determination of whether the shared page has expired may be made in an operation 214. The shared page may be expired based on an expiration time, a triggering event that closes the shared page, a user input to close the shared page, and/or other information that causes the shared page to be closed.

Other aspects of the page service may be implemented as described in one or more of U.S. Pat. No. 8,965,988 ("System and method for providing an event-based and shared page connectivity platform"), U.S. Pat. No. 8,948,732 ("System and method for responding to service requests and facilitating communication between relevant parties") and U.S. Pat. No. 8,792,867 ("System and method for responding to service requests and facilitating communication between relevant parties") all of which are incorporated herein in their entirety by reference.

All publications, patents, and patent applications referred to herein are incorporated by reference in their entirety to the same extent as if each individual publication, patent or patent application was specifically and individually indicated to be incorporated by reference in its entirety.

The various processing operations and/or data flows depicted in FIG. 2 are described in greater detail in the patents incorporated herein. The described operations may be accomplished using some or all of the system components described in detail above and, in some implementations, various operations may be performed in different sequences and various operations may be omitted. Accordingly, the operations as illustrated (and described in greater detail below) are exemplary by nature and, as such, should not be viewed as limiting.

In an implementation, in an operation 202, process 200 may include detecting a trigger for an event-based request based on a user input. The user input may include, without limitation, an initiation of an application (e.g., a mobile app that requests emergency services), a manipulation of user interface (e.g. pressing a button that corresponds to an event-based request), initiation of a phone call to an emergency phone number, and/or other type of user input. Additionally, an event-based request may be generated based on an alert generated by a sensor, that communicates the alert to the client device or to the cloud-based page service.

According to some embodiments, the following is an example of how sensor information (e.g., smartphone and other sensors' information) can be securely transmitted to a PSAP, given the existing technology infrastructure and limitations of PSAPs. One implementation of the invention relates to a software application on a smart phone or other data-enabled device or sensor. First, the user accesses the application to initiate a qualified "call" to a PSAP using text-to-911 from the device. The system adds, to the text (or as a separate text subsequent to the initiation of the call), a page identifier (ID) for a dynamic page ("Page") of a cloud-based page service (described below), a page identifier for a page in a private, FedRamp-certified cloud or a designated private cloud, a Page URL or other page identifier. The dynamic page and cloud-based page service may be implemented as described in U.S. Pat. No. 8,965,988 ("System and method for providing an event-based and shared page connectivity platform"), U.S. Pat. No. 8,948,732 ("System and method for responding to service requests and facilitating communication between relevant parties") and U.S. Pat. No. 8,792,867 ("System and method for responding to service requests and facilitating communication between relevant parties"), each of which is incorporated herein in its entirety.

The PSAP operator can access the dynamic page and receive enhanced content that is dynamically update via the cloud-based page service. This may be done by accessing the Page identifier sent via text to the PSAP as part of or subsequent to the initiation of the call.

The enhanced text-to-911 according to the invention has at least 3 technical advantages. For example, it is considered a qualified means of communicating an emergency 911 request to a PSAP. It automatically has caller location from a cellphone via triangulation and through FCC mandated law, routes the call to the designated PSAP. The basic text can carry vital information about Where, What and Who."

Where is the location: can be extracted live from GPS of a device?

What is the incident type: can be identified from sensor type, voice to text or video and image recognition?

Who is the caller: can be identified via phone number, or live audio/video and image recognition, age, gender, race, and medical 911 profile?

The dynamic Page content can include numerous enhanced features. It can include all 3 of the main required 911 features (Where, What and Who) info mentioned above—this data can be obtained from IoT sensor data including LIVE STREAM of GPS and Camera via the Dynamic Page, for example. All information can be transmitted to and processed via the cloud-based page service and output as useful content that is available via both "Text" and "Page." The content may include an "executive summary" delivered via text-to-911 and can include live data via a Page.

Figure 3:
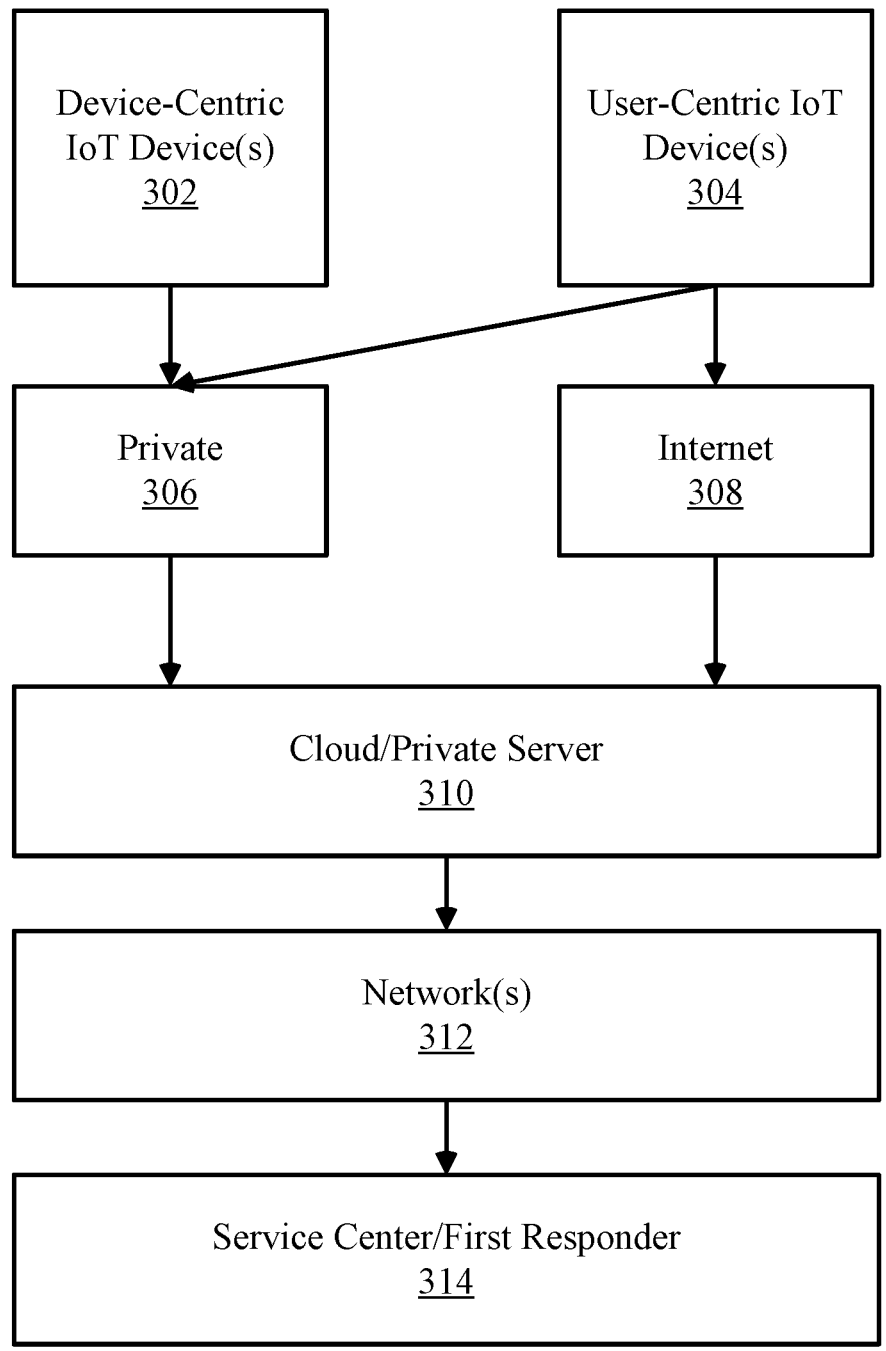
FIG. 3 illustrates examples of communications from devices and/or sensors via various alternatives.

As shown for example in FIG. 3, at least the following steps may be implemented for communicating data/information to a PSAP or call center from Smart devices, IoT devices, other devices. The device may be categorized as device-centric IoT devices 302 and/or user-centric IoT devices 304. Device-centric IoT devices 302 may include devices which may operate autonomously and/or semi-autonomously, which may or may not require user input and/or other user intervention. Device-centric IoT devices 302 may include one or more of smart home devices, connected vehicles, medical devices, and/or other devices. User-centric IoT devices 304 may include devices which may operate based on user input and/or other user intervention. User-centric IoT devices 304 may include one or more of smartphones, tablets, personal computers, web browsers, and/or other devices. The devices may share data (Voice, Location, Media, etc.) with a SIM/data service provider server (such as AT&T, Verizon). This can be done securely in at least the following ways. For example, a private connection 306 may be enabled by the service provider without using Internet. Alternatively, the communication can be done via Encrypted sensor data (GPS, Mic, camera, etc.) using OS provider from sensor itself over Internet 308.

Another step relates to providing a secure connection 310 from the service provider to the cloud-based page service. The secure connection 310 may include one or more of a FedRamp certified cloud, private server, and/or other connections. Once data is processed and qualified by the cloud-based page service, the output can be communicated via a secure communication 312 (e.g., via FirstNet or the like) to service center 314 (e.g., a PSAP call taker, dispatcher, and/or other designated recipient) open the Page.

The following will further explain some sample scenarios. In one scenario, a cellular carrier (e.g., AT&T) collects live sensor data (e.g., GPS, microphone, camera, wearable device data and/or other sensor information). The data may be collected from a smart phone containing or in communication with a variety of sensors. Typically, in many existing systems, sensor data is transmitted via apps over the internet in an unsecure way. According to an aspect of the invention, the cellular carrier securely transmits the sensor information to a private, cloud service via a private, secure link. The sensor information can then be transmitted from the private, cloud (e.g., the carrier's private cloud) to a cloud-based page service. The cloud-based page service receives the data and creates a Page for the "event" and creates a page identifier. The Page identifier can be securely transmitted from the cloud-based page service to the PSAP (via text or otherwise). Subsequent communication of Pages (which may be dynamically updated to include updated sensor data) may be securely transmitted from the cloud-based page service to the PSAP over FirstNet broadband or other known secure communication protocol via which the PSAP approves and accepts communication. This includes a variety of private networks, but not an open public and/or insecure network. This helps ensure that the data are all secure and avoids unsafe transmission via the public Internet. The cloud-based page service may be on a FedRamp certified cloud system.

According to another approach, the cloud-based page provider can coordinate with the developers of smart phone operating systems to build into the operating system (OS) a native functionality for 911 calls that ensures any sensor data from or through the phone is encrypted and secured and securely sent to a private cloud (e.g. a private cloud of the phone service provider) rather than being transmitted over the Internet or public, not secure network.

Various categories of devices can use this technology. This includes, but is not limited to, smart devices and/or IoT devices. The Smart Devices can include smartphones, tablets, PCs, personal SoS devices or any device that can run a web browser or mobile application. For these devices, people operate these devices and manually enter a request to initiate a 911 call via text (or otherwise). The IoT Devices can include any device with an IoT sensor, including, but not limited to, devices for Connected Home (Building), Connected Vehicle, Personal SoS Devices, Medical Sensors and/or other devices. In these cases, the IoT sensors can dynamically generate data and can be programmed with algorithms to detect an emergency (according to a stored set of rules), generate alert in accordance with the rules and automatically transmit relevant information to the cloud-based page service. All information can be processed via the cloud-based page service and output as useful content that is available via both "Text" and "Page"

The Page may include sensor data such as data from IoT sensors, GPS, Mic audio, Camera Video, Wearable data from a Smart devices, Connected Home device data, Connected Vehicle data, special Medial Device data, SOS devices and other sensors. The sensors may be standalone sensors, part of another device such as a smartphone, wearable device, connected home device, or may be in communication with a device such as a smartphone or other device. The sensor data maybe updated in real-time, near-real time or at other suitable intervals.

According to another aspect of the invention, the cloud-based service may handle a variety of types of request from a variety of wireless communication enabled sensors, including IoT and/or other devices. For simplicity and generality, the term sensor will be used. The invention is not limited and principles of the invention can be applied to a variety of devices that can issue event-based requests and a variety of resources that can service the requests.

The sensor device may be programmed with an application that is configured to facilitate communication with the cloud-based service and/or the sensor device may be configured with code that automatically routes requests from the sensor device to the cloud-based service.

The cloud-based service may process and communicate relevant information and communicate it to PSAP and/or add it to a dynamic page created for the emergency event.

According to other aspects of the invention, the IoT sensors can provide live data. This data is processed (by software at the sensor, on a device in communication with the sensor and/or in the cloud-based page service) and compared to a threshold or other setting stored as part of a rule. Once IoT data passes the threshold an ALERT is created that indicates the need to connect with a 911 dispatch or call center PSAP. The following are some examples.

Sensors within a vehicle can detect a collision, the data is reported and the cloud-based page service analyzes the data bases stored business rules, logic and AI in a known manner. If the sensors indicate an accident, an automated call or notification is sent to driver, the driver response confirms the severity of the accident. The accident is qualified, and a call is initiated to a 911 PSAP.

IoT sensors can create an ALERT in other scenarios.

There are at least 3 mechanisms to generate the text-to-911 as described above. Other approaches may be used. Assuming the IoT devices cannot text-to-911, here are some options, that can be programmed via the software application:

The IoT device connects to owner or other smartphone via Bluetooth, Wi-Fi, and/or other means and then the phone can be used to initiate a qualified text-to-911 with known location to designated PSAP or call centers;

The IoT device connects to the cloud-based page service, then the cloud-based page service communicates with/wakes up the owner smartphone and/or other designated smartphone and performs the task by sending a text-to-911; and/or The cloud-based page service identifies the device location and sends a text-to-911 via a routing mechanism to a designated PSAP in that area.

In some implementations, an approach in which an indication to initiate a communication to a service center may be generated and/or received at a client device may be based on one or more of generating, at an Internet-of-Things (IoT) sensor and/or device, event-related sensor data; establishing a connection between the client device and the IoT sensor and/or device (e.g., via Bluetooth, Wi-Fi, and/or other means); sending the event-related sensor data from the IoT sensor to the client device; and/or other processes. The sending of the event-related sensor data from the IoT sensor to the client device may itself be the indication to initiate a communication to a service center and/or the event-related sensor data may be accompanied by such an indication.

In some implementations, an approach in which an indication to initiate a communication to a service center may be generated and/or received at a client device may be based on one or more of generating, at an Internet-of-Things (IoT) sensor and/or device, event-related sensor data; establishing a connection between the IoT sensor and/or device and the cloud-based page service; sending, from the cloud-based page service to the client device, the indication to initiate the communication to the service center; and/or other processes.

In some implementations, an approach in which a communication to a service center may be generated and/or received at a client device may include obtaining, at the cloud-based page service, device location of the client device; routing, by the cloud-based page service via a routing mechanism, the communication to the service center including a page identifier; and/or other processes. A routing mechanism may include performing a comparison between the device location with locations of service centers to determine the closest match (e.g., by proximity).

Once a Smartphone with the software application initiates a call it may provide updated information to the cloud-based page service about WHERE (GPS data), WHAT (Other sensors including audio), WHO (caller bio), and/or other information. The cloud-based page service can update the event Page so the information can be dynamically updated in real time and viewed by event-related recipients.

At least the following steps may be implemented for communicating data/information to a PSAP or call center from Smart devices, IoT devices or other devices. The devices may share data (Voice, Location, Media, etc.) with a SIM/data service provider server (such as AT&T, Verizon). This can be done securely in at least the following ways. For example, a private connection may be enabled by the service provider without using Internet. This applies to both IoT and Smart devices. Alternatively, the communication can be done via Encrypted sensor data (GPS, Mic, camera, etc.) using OS provider from sensor itself over Internet.

Another step relates to providing a secure connection from the service provider to the cloud-based page service. Once data is processed and qualified by the cloud-based page service, the output can be communicated via a secure communication (e.g., via FirstNet to open the Page by a PSAP call taker or dispatcher).

Various categories of devices can use this technology. This includes, but is not limited to, smart devices and/or IoT devices. The Smart Devices can include smartphones, tablets, PCs, personal SoS devices or any device that can run a web browser or mobile application. For these devices, people operate these devices and manually enter a request to initiate a 911 call via text (or otherwise). The IoT Devices can include any device with an IoT sensor, including, but not limited to, devices for Connected Home (Building), Connected Vehicle, Personal SoS Devices, Medical Sensors and/or other devices. In these cases, the IoT sensors can dynamically generate data and can be programmed with algorithms to detect an emergency (according to a stored set of rules), generate alert in accordance with the rules and automatically transmit relevant information to the cloud-based page service. All information can be processed via the cloud-based page service and output as useful content that is available via both "Text" and "Page."

The Page may include sensor data such as data from IoT sensors, GPS, Mic audio, Camera Video, Wearable data from a Smart devices, Connected Home device data, Connected Vehicle data, special Medial Device data, SOS devices and other sensors. The sensors may be standalone sensors, part of another device such as a smartphone, wearable device, connected home device, or may be in communication with a device such as a smartphone or other device. The sensor data maybe updated in real-time, near-real time or at other suitable intervals.

The following with further explain some sample scenarios. In one scenario, a cellular carrier (e.g., AT&T) collects live sensor data (e.g., GPS, microphone, camera, wearable device data and/or other sensor information). The data may be collected from a smart phone containing or in communication with a variety of sensors. Typically, in many existing systems, sensor data is transmitted via apps over the internet in an unsecure way. According to an aspect of the invention, the cellular carrier securely transmits the sensor information to a private, cloud service via a private, secure link. The sensor information can then be transmitted from the private, cloud (e.g., the carrier's private cloud) to a cloud-based page service. The cloud-based page service receives the data and creates a Page for the "event" and creates a page identifier. The Page identifier can be securely transmitted from the cloud-based page service to the PSAP (via text or otherwise). Subsequent communication of Pages (which may be dynamically updated to include updated sensor data) may be securely transmitted from the cloud-based page service to the PSAP over FirstNet broadband or other known secure communication protocol via which the PSAP approves and accepts communication. This includes a variety of private networks, but not an open public and/or insecure network. This helps ensure that the data are all secure and avoids unsafe transmission via the public Internet. The cloud-based page service may be on a FedRamp certified cloud system.

According to another approach, the cloud-based page provider can coordinate with the developers of smart phone operating systems to build into the operating system (OS) a native functionality for 911 calls that ensures any sensor data from or through the phone is encrypted and secured and securely sent to a private cloud (e.g. a private cloud of the phone service provider) rather than being transmitted over the Internet or public, not secure network.

According to another aspect of the invention, the cloud-based service may handle a variety of types of request from a variety of wireless communication enabled sensors, including IoT and/or other devices. For simplicity and generality, the term sensor will be used. The invention is not limited and principles of the invention can be applied to a variety of devices that can issue event-based requests and a variety of resources that can service the requests.

The sensor device may be programmed with an application that is configured to facilitate communication with the cloud-based service and/or the sensor device may be configured with code that automatically routes requests from the sensor device to the cloud-based service.

The cloud-based service may process and communicate relevant information and communicate it to PSAP and/or add it to a dynamic page created for the emergency event.

Figure 4:
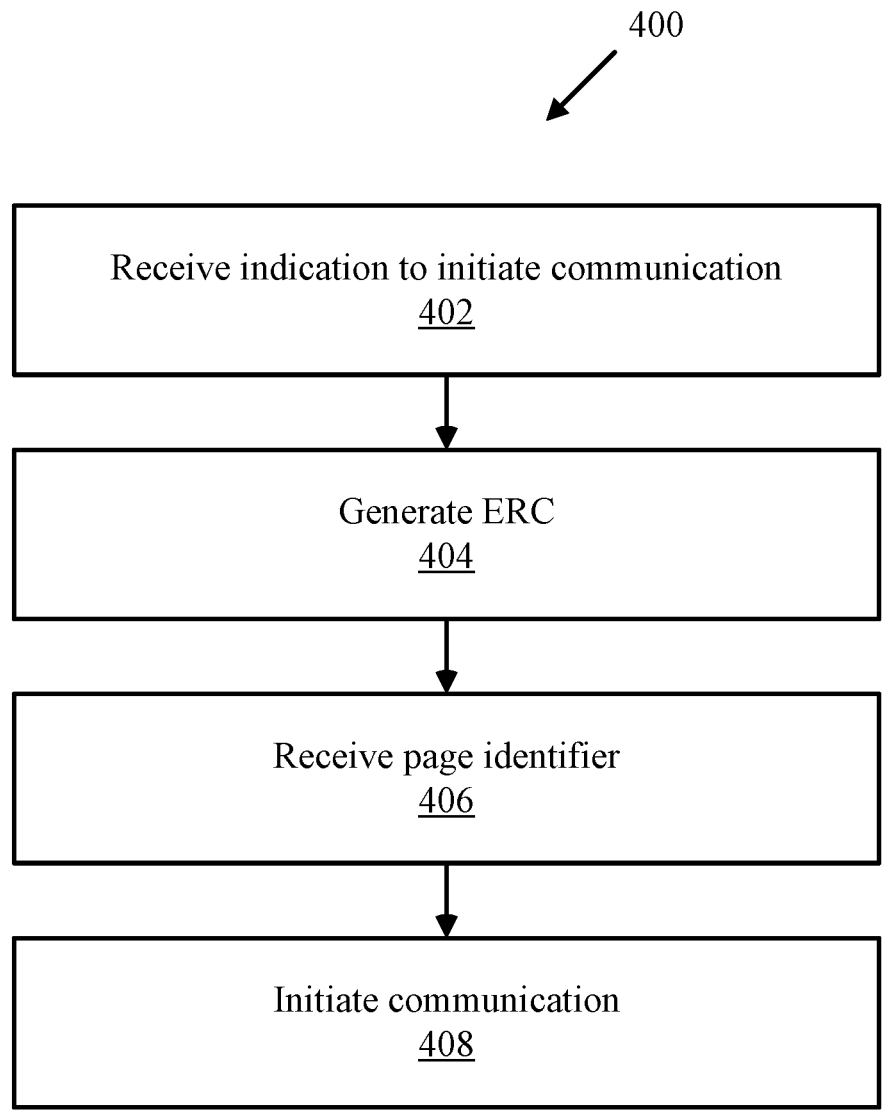
FIG. 4 illustrates a method to generate event-based request communications (ERC) to enable enhanced content to be transmitted in association with a communication from a client device programmed with an ERC software application to a service center, in accordance with one or more implementations.

FIG. 4 illustrates a method 400 to generate event-based request communications (ERC) to enable enhanced content to be transmitted in association with a communication from a client device programmed with an ERC software application to a service center, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). In some implementations, the method 400 may be implemented in a client device having one or more physical processors programmed with computer program instructions. The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include receiving, via the ERC software application, an indication to initiate a communication to the service center. Operation 402 may be performed by one or more hardware processors configured by machine-readable instructions including a computer program instruction component.

An operation 404 may include generating, by the ERC software application, an ERC to a cloud-based page service. Operation 404 may be performed by one or more hardware processors configured by machine-readable instructions including a computer program instruction component.

An operation 406 may include receiving, from the cloud-based page service, a page identifier for a dynamic event page created by the cloud-based page service for an event. Operation 406 may be performed by one or more hardware processors configured by machine-readable instructions including a computer program instruction component.

An operation 408 may include initiating, by the ERC software application, a communication to the service center including the page identifier. Operation 408 may be performed by one or more hardware processors configured by machine-readable instructions including a computer program instruction component.

Other implementations, uses, and advantages of the invention will be apparent to those skilled in the art from consideration of the specification and practice of the invention disclosed herein. The specification should be considered exemplary only.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer implemented method of generating event-based communications, the method being implemented in a computer system having one or more physical processors programmed with computer program instructions that, when executed by the one or more physical processors, cause the computer system to perform the method, the method comprising:

generating, at a sensor associated with a user, event-related sensor data for an event;

in response to the sensor generating the event-related sensor data, establishing a connection between the sensor and a cloud-based page service;

in response to the establishing the connection between the sensor and the cloud-based page service, sending, from the cloud-based page service to a client device associated with the user, an indication to initiate a communication from the client device to a service center;

creating, by the cloud-based page service, a dynamic event page for the event;

receiving, at the client device from the cloud-based page service, a page identifier for the dynamic event page in response to the dynamic event page being created by the cloud-based page service; and initiating, by the client device and in response to receiving the indication and the page identifier, the communication to the service center, the communication including the page identifier.

2. The method of claim 1, further comprising:

transmitting the event-related sensor data to the cloud-based page service;

updating, by the cloud-based page service, the dynamic event page based on the event-related sensor data, such that that the dynamic event pages includes the event-related sensor data;

generating, at the sensor, additional event-related sensor data for the event;

transmitting the additional event-related sensor data to the cloud-based page service; and further updating, by the cloud-based page service, the dynamic event page by adding the additional event-related sensor data to the dynamic event page.

3. The method of claim 1, wherein the service center is a PSAP, the communication is a qualified text-to-911 communication, and the page identifier is transmitted with the qualified text-to-911 communication.

4. The method of claim 1, wherein the sending, by the cloud-based service page, of the indication to initiate the communication to the client device is further triggered by user input into the client device.

5. The method of claim 1, further comprising generating client device data by a second sensor of the client device.

6. The method of claim 1, wherein the cloud-based page service receives updated information for the event and dynamically updates the dynamic event page, and wherein the method further comprises:
   initiating an updated communication to the service center including the page identifier.

7. The method of claim 1, wherein the indication to initiate the communication to the service center is sent based further on:
   establishing a connection between the client device and the sensor; and
   sending the event-related sensor data from the sensor to the client device.

8. The method of claim 1, further comprising:
   obtaining, at the cloud-based page service, device location of the client device; and
   routing, by the cloud-based page service via a routing mechanism, the communication to the service center including the page identifier.

9. The method of claim 8, wherein the routing mechanism includes performing a comparison between the device location with locations of service centers to determine a closest match.

10. A system configured to generate event-based communications, the system comprising:
    one or more physical processors programmed with computer program instructions to:
      generate, at a sensor associated with a user, event-related sensor data for an event;
      in response to the sensor generating the event-related sensor data, establish a connection between the sensor and a cloud-based page service;
      in response to establishing the connection between the sensor and the cloud-based page service, send, from the cloud-based page service to a client device associated with the user, an indication to initiate a communication from the client device to a service center;
      create, by the cloud-based page service, a dynamic event page for the event;
      receive, at the client device from the cloud-based page service, a page identifier for the dynamic event page in response to the dynamic event page being created by the cloud-based page service; and
      initiate, by the client device and in response to receiving the indication and the page identifier, the communication to the service center, the communication including the page identifier.

11. The system of claim 10, wherein the one or more physical processors are further programmed with the computer program instructions to:
    transmit the event-related sensor data to the cloud-based page service;
    update, by the cloud-based page service, the dynamic event page based on the event-related sensor data, such that that the dynamic event pages includes the event-related sensor data;
    generate, at the sensor, additional event-related sensor data for the event;
    transmit the additional event-related sensor data to the cloud-based page service; and
    further update, by the cloud-based page service, the dynamic event page by adding the additional event-related sensor data to the dynamic event page.

12. The system of claim 10, wherein the service center is a PSAP, the communication is a qualified text-to-911 communication, and the page identifier is transmitted with the qualified text-to-911 communication.

13. The system of claim 10, wherein sending, by the cloud-based service page, of the indication to initiate the communication to the client device is further triggered by user input into the client device.

14. The system of claim 10, wherein the one or more physical processors are further programmed with the computer program instructions to generate client device data by a second sensor of the client device.

15. The system of claim 10, wherein the cloud-based page service receives updated information for the event and dynamically updates the dynamic event page, and wherein the one or more physical processors are further programmed with the computer program instructions to:
    initiate an updated communication to the service center including the page identifier.

16. The system of claim 10, wherein the indication to initiate the communication to the service center is sent based further on:
    establishing a connection between the client device and the sensor; and
    sending the event-related sensor data from the sensor to the client device.

17. The system of claim 10, wherein the one or more physical processors are further programmed with the computer program instructions to:
    obtain, at the cloud-based page service, device location of the client device; and
    route, by the cloud-based page service via a routing mechanism, the communication to the service center including the page identifier.

18. The system of claim 17, wherein the routing mechanism includes performing a comparison between the device location with locations of service centers to determine a closest match.

* * * * *